Jan. 28, 1936.    W. F. FRIEDMAN ET AL    2,028,772
CRYPTOGRAPHIC SYSTEM
Filed Jan. 23, 1932    2 Sheets-Sheet 1
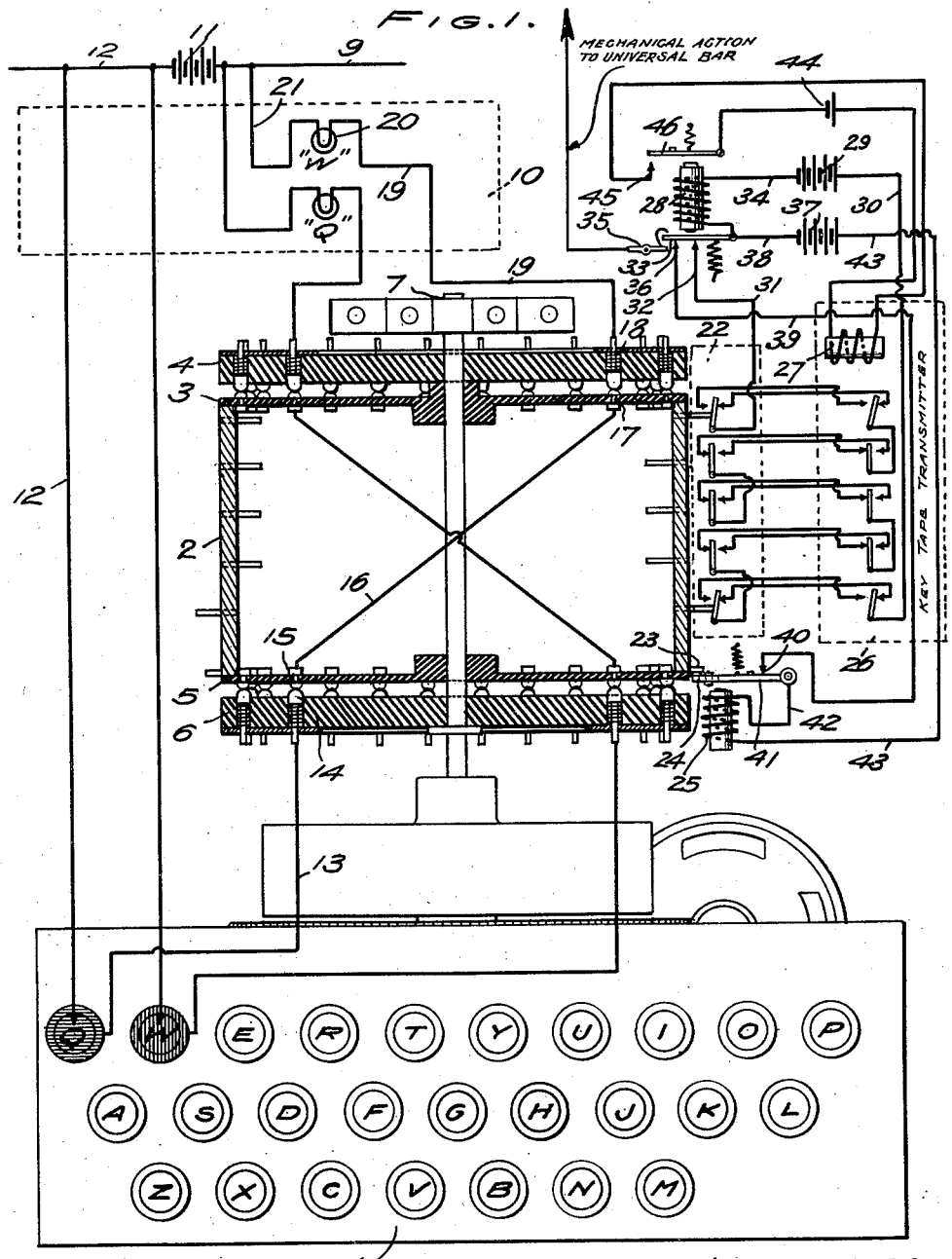
INVENTORS
WILLIAM F. FRIEDMAN
GEORGE A. GRAHAM
BY
ATTORNEYS Jan. 28, 1936. W. F. FRIEDMAN ET AL 2,028,772
CRYPTOGRAPHIC SYSTEM
Filed Jan. 23, 1932 2 Sheets-Sheet 2
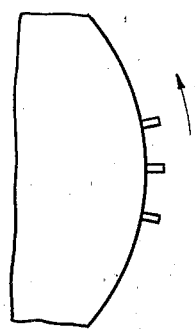
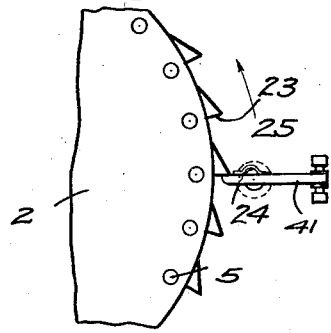
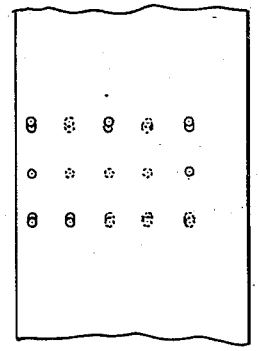
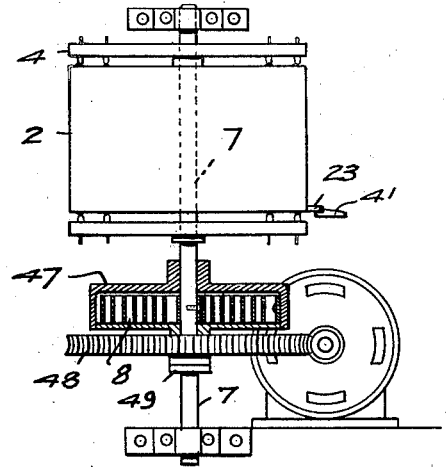
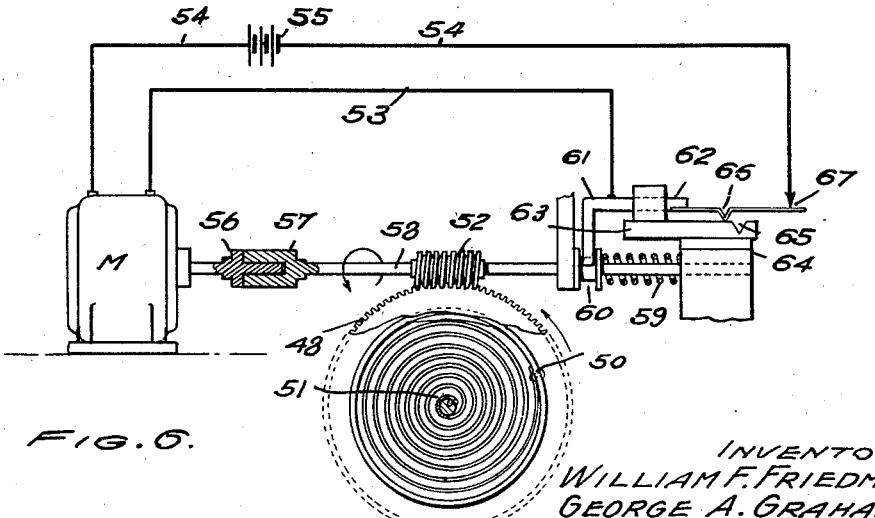
INVENTORS
WILLIAM F. FRIEDMAN
GEORGE A. GRAHAM
ATTORNEYS

UNITED STATES PATENT OFFICE 2,028,772

CRYPTOGRAPHIC SYSTEM

William F. Friedman, Washington, D. C., and George A. Graham, Fort Monmouth, Oceanport, N. J.

Application January 23, 1932, Serial No. 588,344

34 Claims. (Cl. 35—4)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to cryptographic systems and an object of the invention is to provide a cryptograph for enciphering and deciphering messages automatically, rapidly and by a method which, being absolutely aperiodic, renders the cryptograms unsolvable without the key.

A further object of this invention is the provision of a cryptograph controlled by means coordinated with a cipher-key transmitter through which is passed a key tape which serves as the keying element in the encipherment or decipherment of messages.

A further object of this invention is the provision of a cryptograph, which, although employing for its keying element a plural-unit-code of the Baudot type (a code of thirty-two permutations), nevertheless produces cryptograms the characters of which are restricted to the twenty-six letters of the alphabet. In this respect the cryptograph excludes the usual six extra Baudot characters, the transmission of which occasions much difficulty in ordinary telegraphy by the Morse alphabet. The way in which these six extra characters are eliminated constitutes one of the unique and important features of our invention.

A further object of this invention is to provide a cryptograph adapted to function either independently as a self-contained cryptographic unit, or in conjunction with an independent typewriter having a standard typewriter keyboard. In the first case, the cryptograph makes no permanent record of the message, but merely produces visual signals; in the second case, the cryptograph makes possible the production of a written record of the message.

A further object of this invention is the provision of a cryptograph functioning at the transmitting end of a communication system as a means for directly controlling a telegraph transmitter keyboard, so that the intelligence to be transmitted is automatically enciphered before transmission; and similarly, at the receiving end, a corresponding cryptograph functions as a means for indirectly controlling an ordinary typewriter so that the intelligence received in cryptographic form is deciphered before being typed by the typewriter.

By way of an introductory statement to our invention, it may be said that in practically all the portable mechanical, electrical, or mechanico-electrical cryptographic devices or systems heretofore devised, the cryptographing and decryptographing of messages is entirely controlled by elements all embodied within the mechanism itself; that is, the basic or invariable elements concerned in the cryptographic treatment, as well as the keying, or variable elements for controlling and cryptographic treatment are integral parts of the device or apparatus. In contradistinction to this situation, in our invention, only the basic, or invariable elements concerned in the cryptographic treatment are integral parts of the mechanism, the keying, or variable elements being wholly independent of the mechanism itself, and consist of an extraneous factor which when properly associated with the mechanism controls the basic or invariable elements of the mechanism in cryptographing and decryptographing messages.

In the accompanying drawings:

Fig. 1 is a diagrammatic illustration of a mechanism embodying the invention;

Fig. 2 is a view in side elevation showing part of the commutator or connection changing device;

Fig. 3. shows that part of the commutator which carries the ratchet mechanism and also includes an illustration of the wheel stepping magnet and pawl;

Fig. 4 shows a section of the commutator carrying an arrangement of pins on its rim;

Fig. 5 is a view in side elevation showing a detail of the commutator drive and tensioning motor; and Fig. 6 is a plan view partly in section of the commutator drive and automatic control therefor.

It is believed that an explanation of the schematic representation of our invention will form the best basis for its understanding, and therefore reference will be made more particularly to Figure 1. In this figure, 1 represents the keyboard of the cryptograph, the arrangement of the twenty-six keys thereof being that of the standard typewriter keyboard except that only twenty-six keys corresponding to the twenty-six letters of the alphabet are included. Each key of the keyboard operates an electrical contact, as shown schematically for the Q and W keys. In addition, our keyboard is provided with a universal bar which is actuated with each depression of any key. Keyboards of this type are well known in the art and require no further description.

The cipher wheel or commutator is shown at 2 in Figure 1. It may be made of bakelite or similar material, and serves as a commutator or connection changing device for carrying fiftytwo brush-type contacts arranged in two rings or sets of twenty-six each, one set being placed on the obverse face 3, of the wheel 2, the other set being similarly placed on the reverse face 5, of the wheel. The twenty-six contacts on each face are arranged equidistantly from one another in a circle adjacent to the periphery of the face, the contacts on the obverse face being connected to those on the reverse face by means of flexible, insulated conductors which pass through the interior of the wheel, as shown schematically and by way of example in Figure 1, for two pairs of contacts. The cipher wheel or commutator is fixed upon the shaft 7, which serves as an axis about which the wheel may rotate. The contacts of the obverse face 3, of the cipher wheel press against ball-bearing type contacts arranged on the fixed plate 4; the contacts of the reverse face 5, of the cipher wheel press against ball-bearing type contacts arranged on the fixed plate 6. The fixed plates 4 and 6 each contain twenty-six contacts arranged equidistantly in a circle. The cipher wheel rotates between these fixed plates 4 and 6 so that each contact on the obverse face 3, of the cipher wheel presents itself in turn to each contact on plate 4, and each contact on the reverse face 5, of the cipher wheel presents itself in turn to each contact on plate 6, as the said wheel rotates. The contacts of plate 6 are respectively connected by conductors to the contacts of the keyboard 1; the contacts of plate 4 are respectively connected by conductors to a bank of twenty-six electrical elements which may be small lamps, relays, or solenoids, only two of which are shown as at 10. For the sake of simplicity of explanation, it will be assumed that the electrical elements in this bank are lamps. As shown in Figure 1, when the key Q is depressed, assuming the cipher wheel to be in the position indicated in the figure, a circuit is established as follows: From positive pole of battery 11 through conductor 12, closed contact at the Q key, conductor 13, contact 14 on fixed plate 6, contact 15 on cipher wheel 2, conductor 16, contact 17 of cipher wheel 2, contact 18 of plate 4, conductor 19, through lamp 20, conductor 21 to negative of battery 11. Lamp 20 has a translucent glass window before it, on which a letter is painted, say the letter W. Hence, depression of the key Q on the keyboard gives the cipher resultant W, under the conditions specified.

Suppose that the key W of the keyboard is depressed, instead of Q. By following the path set up for the electrical current, it will be seen that the Q lamp will be lighted. Thus, reciprocity is established between the keys on the keyboard and the lamps so that if, for example, Q=W, in enciphering, W=Q in deciphering. The same reciprocal relationship can be established throughout the alphabet by connecting the flexible conductors in the interior of the cipher wheel in an appropriate manner to paired contacts on the obverse and reverse faces of the cipher wheel.

If the cipher wheel were stationary, the relationship between the key depressed and the lamp illuminated, that is, the equivalence between plain-text and cipher letters, would be fixed for each wiring of the interior of the cipher wheel. But the cipher wheel is rotatable and hence this relationship is subject to variation. As thus far described our cipher wheel is by no means novel in the art, similar wheels being well known in other cryptographs. Our cipher wheel is, however, novel in respect to certain features connected with the way in which the relationship between plain-text and cipher letters is varied and controlled, and these features will now be presented.

The rim or tire of our cipher wheel 2, is provided with 130 pins arranged in five superimposed bands each band consisting of 26 equidistantly-spaced pins. These pins, which are operable independently, are preferably arranged in groups of fives transversely of the rim face, and are positioned for permutative operation in accordance with the permutations of a plural unit code such as the 5-unit or Baudot code. To explain what is meant, we may say that according to the Baudot code, the permutation of elements for the letter A, for example, is represented thus:

$$\begin{array}{ccccc} 1 & 2 & 3 & 4 & 5 \\ + & + & - & - & - \end{array}.$$

For our purposes we will let the + sign indicate that a pin is to be positioned for positive operation, the − sign, that it is to be left in its inoperative or inactive position. In Figure 2 there is shown a view in side elevation of a section of the rim of the cipher wheel or commutator, with the pins now being described. The pins indicated by dotted lines in Fig. 4 represent pins which have been left depressed in their inactive positions; the pins indicated by whole lines represent pins which have been elevated into their active positions. The permutations represented in Figure 4 correspond to the Baudot signals for the letters Y, Z and A. The order of the letters in Figure 4, is, of course, only illustrative, since all the pins can be arranged in active or inactive positions to correspond with any sequence of signals of the Baudot code, and hence this sequence may be varied at will.

The function of the pins on the rim of the cipher wheel is to control the commutator transmitter shown within the dotted line block designated as at 22 in Figure 1, which consists essentially of a set of 5 contact-levers movable between paired left and right contacts. Formally, these contact-levers are held against the left contact, by the action of respective retractile springs, but when a pin on the rim of the cipher wheel is in its active or operative position, as in the case of pin 48 in Fig. 1, and can therefore present itself to the contact-lever with which it is associated, it presses against the contact-lever and causes it to make contact at the right. Pins in their inactive positions do not, of course, act upon these contact-levers, allowing the latter to remain against their respective left-hand contacts. The function of the paired contacts controlled by the respective contact-levers of the commutator transmitter will be explained presently.

A portion of the cipher wheel near the edge of the reverse face 5, is formed to carry a ratchet wheel, shown in Figure 3. This ratchet wheel contains twenty-six equidistantly-spaced teeth, only five of which are shown in Figure 3, one tooth being designated as 23. It is likewise designated 23 in Figure 1. Associated with the ratchet wheel is the pawl shown at 24, Figures 1 and 3. The ratchet wheel and pawl, together with electro-magnet 25 and its armature 41, Figures 1 and 3, determine the stop position of the cipher wheel in its rotation on the shaft 7, under the drive of coiled spring 8, which is wound or maintained under a desired tension by a motor M.

Referring to Fig. 5, the spring 8 may be conveniently housed in a barrel 47, fixed on the shaft 7 for integral movement therewith and with said cipher wheel, which is also keyed or otherwise secured to the shaft 7. A worm wheel 48 having a hollow hub 49 is journaled for rotation on shaft 7 and functions through associated instrumentalities to actuate tensioning spring 8, one end of said spring being secured to the worm wheel at 50 (see Fig. 6) and the other end of the spring being fixed to the shaft at 51. As before stated spring 8 is maintained under tension by motor M (see Fig. 6), which is coupled to drive the worm wheel by means of worm gear 52.

As will be seen by reference to Fig. 6, the circuit for the motor, which keeps coiled spring 8 under tension, is closed or opened according to the degree of tension which it is desired to maintain upon the said spring; that is, after the spring is sufficiently tensioned, the circuit is interrupted to stop the motor and is only started again by closing the circuit when the tension has been decreased below a predetermined minimum. For the purpose of controlling this action, the circuit arrangement in operative connection with the motor, comprises leads 53 and 54, including a voltage source 55. The motor shaft is operatively coupled to the worm gear 52 by means of a slide coupling comprising components 56 and 57. When the motor operates to put tension upon the spring 8, component 57 of the slide coupling is gradually moved away from its component member 56 due to the resistance of said spring 8. Thus the worm wheel 48 tends to move the worm gear as indicated by the arrow and progresses the entire shaft 58 from the slide coupling to the right (see Fig. 6) against the action of spring 59. Sleeve 60 which is rigidly secured to shaft 58, is operative through the adjustable L-shaped arm 61 with spring contact member 62, said member being adapted to ride on insulated block 63, conveniently mounted on bearing 64, in which shaft 58 is journaled. Block 63 is provided with a notch or groove 65, into which the projection 66 of spring contact member 62 will drop and break the contact at 67 to open the circuit and stop the motor M. During this period of operation, it should be noted that the drive shaft 7 is held from rotation, normally, by the armature 41 of magnet 25.

While a spring motor driving mechanism for the cipher wheel is here disclosed by way of example, it is understood that other methods are contemplated such as motor and clutch, or a stepping magnet arrangement, or other suitable means that will impart movement to the cipher wheel in accordance with the principles of the invention.

The movement of the cipher wheel is preferably step-by-step, or at intervals which will be explained subsequently in discussing the way in which the whole system functions.

The cipher-key transmitter 26, Figure 1, is a slightly modified Baudot code transmitter such as is employed with printing telegraph equipment of known commercial types. Its general features need not be explained, similar transmitters being well known in the art. It is sufficient to say here that a tape containing perforations permuted in accordance with the Baudot code is passed through this transmitter, setting up a series of five contacts inside the transmitter in accordance with the Baudot code. The transmitter is, of course, also provided with a tape-stepping magnet 27, the function of which is to step the tape forward at proper intervals. The principal difference between the transmitter as used in standard printing telegraph equipment and as used in our invention consists in the way in which the left and right paired contacts of the normal Baudot tape transmitter are interconnected. In the normally-wired transmitter the five contact-levers and their ten associated, paired contacts are members of a set of five separate or independent circuits; in the transmitter as modified for our purposes the five contact-levers and their ten associated paired contacts are conductivity-determining members of a series circuit, as explained in the next paragraph.

The cipher-key transmitter 26, is associated and functions jointly with the commutator transmitter 22, to control the angular displacements of the cipher wheel or commutator in the following manner. Note relay 28, which is energized by current from battery 29, through a path which begins at conductor 30 and includes only ten of the twenty contacts and all the contact-levers of commutator transmitter 22, and key-tape transmitter 26, and is completed along conductor 31. Note also the illustrative set-up of contacts and contact-levers at 22 and 26 in Figure 1, in which a specific case is presented. It is assumed there that the arrangement of operative pins on the cipher wheel which are at that moment presenting themselves to the contact-levers of the cipher-wheel transmitter 22, corresponds to the Baudot permutation for letter Z. At the same moment the character on the key tape and the permutation of contacts set-up within the cipher-key transmitter 26, also corresponds to the letter Z. Note that in view of the manner in which the twenty contacts and the ten contact-levers of 22 and 26 are interconnected, the circuit from battery 29 through relay 28 is completed only when the whole set of electrical connections established at the cipher-key transmitter 26, coincides with the whole set of connections established at the commutator transmitter 22. Hence, if Z is set up in cipher-key transmitter 26, relay 28 will operate only when Z is set up in the commutator transmitter 22. Similarly if any other letter, say X, is set up in the cipher-key transmitter 26, relay 28 will operate only when X is set up in the commutator transmitter 22. The complete path of the current when such coincidence of connections in transmitters 22 and 26 is established is as follows:

From positive of battery 29 along conductor 30, through all the contact-levers and the ten associated closed contacts of transmitters 26 and 22, conductor 31 to back contact 32, of armature 33, winding of relay 28, conductor 34, to negative of battery 29. It is obvious that since the armature 33 and back contact 32 of relay 28 form parts of the circuit for energizing relay 28, as soon as the relay has received an impulse and armature 33 is attracted, the circuit for energizing relay 28 is broken at contact 32. Since armature 33 is under tension of a retractile spring, if not prevented from being pulled back into its normal position on release of relay 28, armature 33 would reestablish contact at 32 and would set up a chattering. But the mechanical arrangements are such that when armature 33 is first drawn up by relay 28 it passes by and is immediately engaged by lever 35 and held from returning to its retracted position where it can reestablish contact at 32, until lever 35 is displaced by mechanical action to be described later. Armature 33 of relay 28 also controls the magnet 25, already referred to, which, in turn, controls the rotation of the cipher wheel 2, in the following manner:

The motor-tensioned coiled spring 8, tends to rotate the cipher wheel in the direction indicated by the arrow, say to the right. The circuit for the motor which keeps coiled spring 8 under tension is closed or opened depending upon the tension of the spring; that is, after the spring has sufficient tension, the motor is stopped and is only started again after this tension has decreased below a certain minimum. The rotation of the cipher wheel is step-by-step, controlled by the magnet 25, and the ratchet referred to above. Assume the contact-levers in transmitters 22 and 26 set up to different permutations so that relay 28 is not energized and hence contact 36 is closed. A current starts from positive of battery 37 through conductor 38, closed contact 36, conductor 39, back contact 40, armature 41, conductor 42, winding of magnet 25, conductor 43, to negative of battery 37. A momentary impulse passes through magnet 25 and causes armature 41 to be attracted, breaking the circuit at back contact 40, whereupon armature 41, under action of its spring, returns and again closes the circuit at 40. However, the mechanical arrangement is such that the momentary attraction of armature 41 releases the pawl 24, associated with the ratchet on the cipher wheel and thus allows the cipher wheel, driven by coiled spring 8, to advance one step. Thus, the cipher wheel continues to move, one step at a time, so long as back contact 36 of relay 28 remains closed. When, however, the permutation of contacts set up in the commutator transmitter becomes the same as that set up in the cipher-key transmitter, thus causing the completion of the circuit through relay 28 as already described, and thus, when contact 36 is opened, under the action of relay 28, and is held open by lever 35 as described above, magnet 25 cannot operate to withdraw armature 41; hence the pawl 24 cannot be released, whereupon the cipher wheel cannot advance any further. As stated before, the first impulse through relay 28 causes armature 33 to be attracted, to pass by lever 35, which then engages the armature. Thus contact 36 remains open as long as lever 35 engages and holds it. It is only within this period, when the cipher wheel is stationary, that the keyboard 1, can be manipulated, the mechanical arrangement being such that the keys of the keyboard are locked except when the cipher wheel is stationary.

Suppose now a key is depressed. The cipher resultant will be determined by the position of the cipher wheel at this time, because the circuit established through the cipher wheel depends upon the exact relative position of this wheel with respect to fixed plates 4 and 6. When a key is depressed, the cipher resultant is shown by the illuminated lamp; the latter continues to be illuminated so long as the key is held down.

We return now to relay 28 and its other armature 46. The latter controls the operation of the tape-stepping magnet 27 of the cipher-key transmitter 26, in the following manner: The tape-stepping magnet 27 is actuated by battery 44, but the circuit is normally open at contact 45. When relay 28 is energized, however, armature 46 is attracted and contact 45 is momentarily closed, allowing tape-stepping magnet 27 to function. This causes the key tape to step forward to the next position. It will remain in that position until the next time relay 28 is energized.

There now remains to be described only how lever 35 is controlled: The keyboard is provided with a universal bar, operable by every key. When a key is depressed and then released, the universal bar, near the close of its upward swing on return to normal position, actuates the lever 35, and causes it to be withdrawn from its engagement with armature 33. The latter immediately returns to its normal, retracted position, allowing contacts to be reestablished at 32 and 36. In the meantime the tape-stepping magnet having been actuated as described above, one of two things can happen as regards the set-up of connections in cipher-key transmitter 26: either a new set of connections between contact-levers and paired contacts has been established, or, by chance, if two similar characters occur in sequence on the tape, the same set of connections as before has been established. These two cases are described in turn:

(1) If a new set of connections in cipher-key transmitter 26 has been established, say a set corresponding to the Baudot signal for X, the set of connections no longer matches that set-up in the commutator transmitter 22, which, as we have seen, corresponded in the preceding case to the letter Z. Consequently, immediately upon closing of contact at 36 under action of the universal bar, the circuit for energizing magnet 25 is closed, allowing the cipher wheel to step forward. It will continue to do so until that set-up of pins on the rim of the cipher wheel corresponding to letter X presents itself to the contact-levers of the commutator transmitter 22, whereupon relay 28 is energized, contact at 36 is broken, magnet 25 deenergized, and the cycle has been completed.

(2) If, by chance, the next character on the key tape is the same as before (Z again), relay 28 is immediately energized, since the commutator transmitter is still set up for permutation Z. Magnet 25 does not function and the cipher wheel is held in place. Two letters are therefore enciphered at the same position of the cipher wheel. Of course, if the key tape now consists of a series of Z's, the cipher wheel will remain in fixed position during the encipherment of a corresponding number of letters.

It is obvious that the permutations of perforations on the key tape as well as the permutations of operative pins on the rim of the cipher wheel must be restricted to two sets of 26 similar permutations, otherwise there would be times when the cipher wheel would continue to revolve indefinitely and no encipherment or decipherment could take place. This is true for the reason that in order to bring the cipher wheel to rest it is essential that a permutation of pins on its rim exactly coincide with that permutation which happens to be set up at the cipher-key transmitter at that moment. This restriction to two sets of similar permutations does not, however, reduce the cryptographic security of the system in any degree whatsoever.

In addition, attention is especially called to the way in which a serious disadvantage of other cryptographs employing the Baudot code for cryptographic purposes is obviated in our system. In order to explain what is meant it is necessary to enter into a brief discussion of Baudot transmission from the practical, economic point of view. For this purpose reference is made to U. S. Patent No. 1,416,765, issued May 23, 1922, to G. S. Vernam, lines 12 to 81 of the specification.

In the patent to which reference has just been made, a special mechanism was devised to suppress the six extra characters which cause all these difficulties; and while accomplishing the object intended, the mechanism is quite complicated and has in addition the further disadvantage that the method selected to accomplish the suppression of the six extra characters results in increasing the number of characters to be transmitted by as much as 10 to 30 per cent. In our invention, both these disadvantages have been eliminated in the simplest manner possible, viz., by arrangements which necessitate only 26 of the 32 Baudot permutations for cryptographic purposes. So far as cryptographic technique is concerned, basically our arrangements for eliminating the six extra characters ordinarily introduced by the use of the Baudot code for cryptographic purposes differ from those described in the patent referred to above in the following respect. In the cryptographic system underlying the latter method the cipher resultants in the cryptographic process are the resultants of electrical interaction between a set of signaling elements in the Baudot code set up by a message character and a set of signaling elements in the same code set up by a key character; these resultants can not be restricted to but 26 of the 32 possible Baudot permutations because of this interaction. In our cryptographic system the cipher resultants in the cryptographic process are not at all the resultants of electrical interaction between two sets of signaling elements in the Baudot code; the signaling element representing the message character is not at all in the Baudot code and does not interact directly with the signaling elements representing the key character, nor is the cipher resultant represented by signaling elements in the Baudot code. The role the Baudot code plays in our system is, so far as signaling elements are concerned, only an indirect one, and that is why in our system the restriction of cipher characters to a set of only 26 is rendered easy, without any apparatus specifically introduced to suppress the six extra characters.

It is obvious that instead of having the cryptograph function to produce visual signals of the type indicated in the foregoing description, it is possible to provide at 10, Figure 1, a set of 26 electro-magnets instead of a set of 26 lamps, which magnets would act through proper plungers or armatures directly upon the keyboard of a typewriter with which they are associated, so as to cause the typewriter to print the letters of the cipher message, in the case of enciphering, and the letters of the plain-text message, in the case of deciphering.

Again, these magnets, instead of being associated with the keyboard of an ordinary typewriter, might be associated with the keyboard of an automatic telegraph transmitter keyboard, and thus, in the case of enciphering, bring about the transmission of signals corresponding to enciphered letters. At the receiving end of this system, the received signals would act directly upon the keyboard of the cryptograph, and the latter would cause the received cryptographed signals to be deciphered and, if the cryptograph at the receiving end is associated with a typewriter as described in the preceding paragraph, the cryptograph would cause a written record to be made of the deciphered message.

It is also obvious that the mechanism which we have provided permits of variations in cryptographic resultants other than those introduced by changing the key tape. One of these sources of variations lies in the possibility of changing the permutations of operative and inoperative pins on the rim of the cipher wheel. Another source lies in the changing of connections between the keyboard contacts and the contacts of plate 6, Figure 1; or between the contacts of plate 4 and the signaling elements in bank 10. Another source lies in constructing the cipher wheel in two sections, an upper and lower, so that the two sections can be positioned or juxtaposed at any one of twenty-six different points of coincidence with respect to each other, thus varying the cipher resultants. Another source lies in the changing of connections between the contacts on the obverse and reverse faces of the cipher wheel. Finally, an important source of variation lies in the changing of the connections between the homologous contacts of the cipher-key transmitter 26, and the commutator transmitter 22. All these sources of variation existing within the mechanism itself are subsidiary, however, to the principal source inherent in constant change of key tapes, and it may be said that so long as a given key tape is coextensive in number of characters with that of the intelligence to be enciphered, so that no two messages are ever enciphered by the same key tape or portion thereof, and so long as these key tapes consist of unintelligible, entirely randomized sequences of characters, the messages enciphered according to such a system are absolutely indecipherable without actual possession of the key tapes employed in their encipherment or a knowledge of the sequence of the characters on such key tapes.

We claim:

1. In a cryptographic system adapted for use with a plural unit code transmitter; means comprising electrically operable elements for coordinating the transmitter with said system; and circuit means for interconnecting said elements for cryptographic purposes, said means comprising contact levers and paired contact points permutatively positioned and operative in series relation.

2. In a cryptograph, a keyboard comprising character elements in operative electrical connection with corresponding signaling elements; means comprising a commutator for varying the connections between the keyboard elements and said signaling elements; a commutator transmitter; a cipher-key transmitter; and means coordinated with said transmitters for effecting progressive operation of the commutator.

3. In a cryptograph, a keyboard comprising character elements in operative electrical connection with corresponding signaling elements; means comprising a commutator for varying the connections between the character elements and said signaling elements; a cipher-key transmitter mechanism; and means coordinating said mechanism with the commutator for effecting its progressive operation.

4. In a cryptograph, a keyboard comprising character elements in operative electrical connection with corresponding signaling elements; means comprising a commutator for varying the connections between the character elements and said signaling elements; a cipher-key transmitter mechanism; and means comprising a commutator transmitter coordinating said mechanism with the commutator for effecting its progressive operation.

5. In a cryptograph, a keyboard comprising character elements in operative electric connection with a corresponding number of signaling elements; means comprising a commutator for varying the connections between the keyboard elements and said signaling elements; a commutator transmitter; a cipher-key transmitter; and circuit means coordinated with said transmitters for effecting progressive operation of the commutator.

6. In a cryptograph, a keyboard comprising character elements in operative electrical connection with corresponding signaling elements; means comprising a commutator for varying the connections between the keyboard elements and said signaling elements; a commutator transmitter; a cipher-key transmitter; and circuit means coordinating both of said transmitters for jointly effecting progressive operation of the commutator.

7. In a cryptograph, a keyboard comprising character elements in operative electrical connection with corresponding signaling elements; means comprising a commutator for varying the connections between the keyboard elements and said signaling elements; a commutator transmitter; a cipher-key transmitter; and means coordinating said commutator and cipher-key transmitter through the commutator transmitter for effecting progressive operation of the commutator.

8. In a cryptograph, a keyboard comprising character elements in operative electrical connection with corresponding signaling elements; means comprising a commutator for varying the connections between the keyboard elements and said signaling elements; a commutator transmitter; a cipher-key transmitter mechanism; and means coordinated with both of said transmitters for effecting progressive operation of the commutator, said cipher-key transmitter mechanism being controlled by a keying element which is independent of the cryptograph.

9. In a cryptograph, a keyboard comprising character elements in operative electrical connection with corresponding signaling elements; means comprising a commutator for varying the connections between the keyboard elements and said signaling elements; a commutator transmitter; a cipher-key transmitter mechanism; and means coordinated with both of said transmitters for effecting progressive operation of the commutator, said cipher-key transmitter mechanism being controlled by a tape bearing perforations permuted in accordance with a plural unit code.

10. A cryptograph, comprising an electrical circuit and including a current source; a relay in said circuit; a set of contact levers and paired contact points, permutatively positioned and operative therewith in said circuit; a second set of contact levers and contact points associated in similarly operative relation with said circuit; and means for completing said circuit and energizing said relay only at such times as the entire series of connections established within the first set of contact levers and their associated contact points is identical with the entire series of connections established within the second set of contact levers and their associated contact points.

11. A cryptograph, comprising an electrical circuit and including a current source; a relay in said circuit; a set of contact levers and paired contact points, permutatively positioned and operative therewith in said circuit; a second set of contact levers and contact points associated in similarly operative relation with said circuit; and means for permutatively varying as a set each of the said sets of contact levers.

12. A cryptograph, comprising an electrical circuit and including a current source; a relay in said circuit; a set of contact levers and paired contact points, permutatively positioned and operative therewith in said circuit; a second set of contact levers and contact points associated in similarly operative relation with said circuit; and means for permutatively varying as a set each of the said sets of contact levers, the permutative variations being in accordance with the same plural unit code for both sets of contact levers.

13. A cryptograph, comprising an electrical circuit and including a current source; a relay in said circuit; a set of contact levers and paired contact points, permutatively positioned and operative therewith in said circuit; a second set of contact levers and contact points associated in similarly operative relation with said circuit; means for completing said circuit and energizing said relay only at such times as the entire series of connections established within the first set of contact levers and their associated contact points is identical with the entire series of connections established within the second set of contact levers and their associated contact points; and means for permutatively varying as a set each of the two sets of contact levers, the permutative variations being in accordance with the same plural unit code for both sets of contact levers.

14. A cryptograph, comprising an electrical circuit and including a current source; a relay in said circuit; a set of contact levers and paired contact points, permutatively positioned and operative therewith in said circuit; a second set of contact levers and contact points associated in similarly operative relation with said circuit; and means for permutatively varying as a set each of the said sets of contact levers, the permutative variations for one of said sets of levers being in accordance with one plural-unit code, those of the other of the two sets of levers being in accordance with a different plural-unit code.

15. A cryptograph, comprising an electrical circuit and including a current source; a relay in said circuit; a set of contact levers and paired contact points, permutatively positioned and operative therewith in said circuit; a second set of contact levers and contact points associated in similarly operative relation with said circuit; means for completing said circuit and energizing said relay only at such times as the entire series of connections established within the first set of contact levers and their associated contact points is identical with the entire series of connections established within the second set of contact levers and their associated contact points; and means for permutatively varying as a set each of the two sets of contact levers, the permutative variations for one of said sets of levers being in accordance with one plural-unit code, those of the other of the two sets of levers being in accordance with a different plural-unit code.

16. In a cryptograph, a connection changing vice comprising a rotatable drum, bearing a series of pins arranged in groups about its rim, the groups comprising each a plurality of units positioned transversely of said rim and corresponding in number of groups to a predetermined selection of characters; means for positioning the pins for independent operation in groups in accordance with the permutations of a plural-unit code; said drum also bearing on its obverse and reverse faces respectively a series of equidistantly spaced contact elements arranged in a ring adjacent to the periphery; and means for establishing fortuitous electrical connections between the contact elements of said faces.

17. In a cryptograph, a connection changing device comprising a rotatable drum, bearing a series of pins arranged in spaced groups about its rim, the groups comprising each a plurality of units positioned transversely of said rim and corresponding in number of groups to a predetermined selection of characters; means for positioning the pins for independent operation in groups in accordance with the permutations of a plural-unit code; said drum also bearing on its obverse and reverse faces respectively a series of equidistantly spaced contact elements arranged in a ring adjacent to the periphery; and means for establishing fortuitous electrical connections reciprocally in pairs between the oppositely disposed contact elements of said faces.

18. A cryptograph, comprising an operatively associated electrical circuit and including a current source; a rotatable commutator bearing a series of pins arranged in groups about its rim and positioned for independent operation in accordance with the permutations of a plural-unit code, the groups comprising each a plurality of pins and said groups corresponding in number to a predetermined selection of characters; a transmitter controlled by said pins, said transmitter comprising a set of contact points and contact levers operative therewith in series circuit relation.

19. A cryptograph, comprising an operatively associated electrical circuit and including a current source; a rotatable commutator bearing a series of pins arranged in groups about its rim and positioned for independent operation in accordance with the permutations of a plural-unit code, the groups comprising each a plurality of pins and said groups corresponding in number to a predetermined selection of characters; a transmitter controlled by said pins, said transmitter comprising a set of contact points and contact levers operative therewith in series circuit relation; and means also controlled by said pins and permutatively operable with said transmitter to set up progressive steps in the continuity of said series circuit.

20. A cryptograph, comprising an operatively associated series electrical circuit and including a current source; a relay in said circuit; a rotatable commutator carrying a series of pins positioned in groups about its rim for independent operation in accordance with the permutations of a plural-unit code, the groups comprising each a plurality of pins and said groups corresponding in number to a predetermined selection of characters; a commutator transmitter controlled by said pins, said transmitter comprising a set of contact points and contact levers operative therewith in series circuit relation; means consisting of a cipher-key transmitter, said transmitter comprising a set of contact points and contact levers operative therewith in the same series circuit relation; and means jointly controlled by both of said transmitters for setting up progressive steps in the continuity of said series circuit for operating said relay.

21. In a mechanism of the character described, the combination of a commutator transmitter; a cipher-key transmitter; and a rotatable commutator bearing on its rim a series of pins arranged in sets, the sets corresponding in number to a predetermined selection of characters, said pins being positioned permutatively in groups of five in accordance with a selected set of permutations of a five-unit code.

22. In a mechanism of the character described, the combination of a commutator transmitter; a cipher-key transmitter; and a rotatable commutator bearing on its rim a series of pins arranged in sets, the sets corresponding in number to a predetermined selection of characters, said pins being positioned permutatively in groups of five in accordance with a selected set of permutations of a five-unit code to effect control of said commutator transmitter.

23. In a mechanism of the character described, the combination of a commutator transmitter; a cipher-key transmitter; and a rotatable commutator bearing on its rim a series of pins arranged in sets, the sets corresponding in number to a predetermined selection of characters, said pins being positioned permutatively in groups of five in accordance with a selected set of permutations of a five-unit code to effect control of said commutator transmitter; and means operative with said commutator transmitter for jointly controlling the progressive displacements of the commutator.

24. In a mechanism of the character described, the combination of a commutator transmitter; a cipher-key transmitter; and a rotatable commutator bearing on its rim a series of pins arranged in sets, the sets corresponding in number to a predetermined selection of characters, said pins being positioned permutatively in groups of five in accordance with a selected set of permutations of a five-unit code to effect control of said commutator transmitter; and means coordinated with a cipher-key transmitter mechanism and operative with said commutator transmitter for jointly controlling the progressive displacements of the commutator.

25. In a mechanism of the character described, the combination of a commutator transmitter; a cipher-key transmitter; and a rotatable commutator bearing on its rim a series of pins arranged in sets, the sets corresponding in number to a predetermined selection of characters, said pins being positioned permutatively in groups of five in accordance with a selected order of permutations of a five-unit code, and to the exclusion of undesired permutations of the said code.

26. In a mechanism of the character described, the combination of a commutator transmitter; a cipher-key transmitter; and a rotatable commutator bearing on its rim a series of pins arranged in sets, the sets corresponding in number to a predetermined selection of characters, said pins being positioned permutatively in groups of five in accordance with a selected order of permutations of a five-unit code, and to the exclusion of undesired permutations of the said code to effect control of said commutator transmitter; and means coordinated with said cipher-key transmitter mechanism and operable with said commutator transmitter for jointly controlling progressive displacements of the commutator.

27. In a mechanism of the character described, the combination of a commutator transmitter; a cipher-key transmitter; a rotatable commutator bearing on its rim a series of pins arranged in sets, the sets corresponding in number to a predetermined selection of characters, said pins being positioned permutatively in groups of five in accordance with a selected order of permutations of a five-unit code, and to the exclusion of undesired permutations of the said code to effect control of said commutator transmitter; means coordinated with said cipher-key transmitter and operable with said commutator transmitter for jointly controlling progressive displacements of the commutator; and circuit means including an electro-magnetic relay for controlling said displacements.

28. In a mechanism of the character described, the combination of a commutator transmitter; a cipher-key transmitter; a rotatable commutator bearing on its rim a series of pins arranged in sets, the sets corresponding in number to a predetermined selection of characters, said pins being positioned permutatively in groups of five in accordance with a selected order of permutations of a five-unit code, and to the exclusion of undesired permutations of the said code to effect control of said commutator transmitter; means coordinated with said cipher-key transmitter and operable with said commutator transmitter for jointly controlling progressive displacements of the commutator; and circuit means including an electro-magnetic relay for controlling said displacements, the circuit means being under the joint control of both of said transmitters.

29. A mechanism of the character described, comprising a set of elements constituting a keyboard and a set of elements constituting a signaling bank, said sets of elements being electrically interrelated; a switching device for varying the electrical relation between the two sets of elements; means for angularly displacing the switching device in an aperiodic manner, the angular displacements being unequal.

30. A mechanism of the character described, comprising a set of elements constituting a keyboard, a set of elements constituting a signaling bank, and including electrical connections between said sets of elements; a switching device for varying the connections between the two sets of elements; means for angularly displacing the switching device in an aperiodic manner, the angular displacements being unequal, the inequality in angular displacements being determined by a series of ciphering characters constituting an external cipher key.

31. A mechanism of the character described, comprising a set of elements constituting a keyboard, a set of elements constituting a signaling bank, and including electrical connections between said sets of elements; a switching device for varying the connections between the two sets of elements; means for angularly displacing the switching device in an aperiodic manner, the angular displacements being unequal, the inequality in angular displacements being determined by an external key, said key comprising a non-repeating series of ciphering characters arranged in random, unintelligible order.

32. A mechanism of the character described, comprising a set of elements constituting a keyboard, a set of elements constituting a signaling bank, and including electrical connections between said sets of elements; a switching device for varying the connections between the two sets of elements; means for angularly displacing the switching device in an aperiodic manner, the angular displacements being unequal, the inequality in angular displacements being determined by an external key, said key comprising a nonrepeating series of ciphering characters arranged in random, unintelligible order, the said ciphering characters being employed successively to encipher successive characters of the message.

33. A cryptograph, comprising an operatively associated electrical circuit and including a current source; a rotatable commutator bearing a series of pins positioned for permutative operation in groups comprising each a set of five pins and said groups corresponding in number to a predetermined selection of characters; a cipher-key transmitter; a commutator transmitter controlled by said pins, said transmitter comprising a first set of contact levers and paired contact points electrically operative therewith, said levers being actuated by the permutatively positioned pins of said commutator, when electrically operated through said levers and five of said contact points, to set up a first set of five progressive steps in the continuity of an electrical path for the displacement of the commutator; means coordinated with said commutator transmitter for jointly controlling progressive displacements of the commutator, said means being controlled by said cipher-key transmitter; a second set of contact levers and paired contact points electrically operable therewith, said levers being actuated by said cipher-key transmitter, when circuits are completed through the contact levers of said cipher-key transmitter and five of the contact points, to set up a second set of five progressive steps in the continuity of an electrical path for the displacement of the commutator; means for rotating the commutator; means operative with said commutator to cause aperiodic interruption in its rotation; and means to start and stop the commutator.

34. In a cryptograph, the combination of a bank of twenty-six signaling elements in electrical circuit connection with a twenty-six element keyboard, said keyboard comprising a corresponding number of contacts for closing said circuit connections; a plural-unit code cipher-key transmitter coordinated with said keyboard to jointly control said signaling elements; means for changing the electrical paths between the keyboard elements and signaling elements, said means consisting of a commutator provided with a first set of twenty-six contacts equidistantly distributed on the obverse face of said wheel; a second and homologous set of twenty-six contacts equidistantly distributed on the reverse face of said wheel; conductors respectively connecting the contacts of one face with the contacts of the other face; twenty-six sets of pins mounted on the rim of said wheel and positioned for permutative operation according to the permutations of a five-unit code; a commutator transmitter comprising a first set of five contact levers electrically operable with ten paired contact points, said levers being actuated by the pins of said commutator, when electrically operated through said levers and five of said contact points, to set up a first set of five progressive steps in the continuity of an electrical circuit for the displacement of the commutator; a second and similar set of five contact levers electrically operable with ten paired contact points, said contact levers being actuated by the cipher-key transmitter, when operated through its contact levers and five of its ten associated contact points, to set up a second and similar set of five progressive steps in the continuity of the same electrical circuit for the displacement of the commutator; means dependent upon the continuity of said electrical circuit to effect displacements of the commutator until the first set of five progressive steps exactly matches the second set of five progressive steps in the continuity of said electrical circuit.

WILLIAM F. FRIEDMAN.
GEORGE A. GRAHAM.